United States Patent
Cho et al.

(10) Patent No.: US 12,348,349 B2
(45) Date of Patent: Jul. 1, 2025

(54) SPECTRUM SHAPING METHOD FOR GENERATING SIGNAL HAVING ALMOST CONSTANT ENVELOPE IN COMMUNICATION SYSTEM, AND TRANSMITTER PERFORMING SAME

(71) Applicant: Samsung Electronics Co., Ltd., Gyeonggi-do (KR)

(72) Inventors: Joon Ho Cho, Gyeongsangbuk-do (KR); Jeong Hoon Choi, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/557,417

(22) PCT Filed: Sep. 1, 2021

(86) PCT No.: PCT/KR2021/011769
§ 371 (c)(1),
(2) Date: Oct. 26, 2023

(87) PCT Pub. No.: WO2022/239912
PCT Pub. Date: Nov. 17, 2022

(65) Prior Publication Data
US 2024/0214254 A1    Jun. 27, 2024

(30) Foreign Application Priority Data
May 13, 2021   (KR) .......................... 10-2021-0062248

(51) Int. Cl.
*H04L 27/26*   (2006.01)
(52) U.S. Cl.
CPC ................................ *H04L 27/2636* (2013.01)
(58) Field of Classification Search
CPC ............. H04L 27/2601; H04L 27/2626; H04L 27/2627; H04L 27/2634; H04L 27/2636;
(Continued)

(56) References Cited

U.S. PATENT DOCUMENTS 8,638,880 B2 *   1/2014   Baldemair ............ H04L 5/0019
                                                                     375/295
8,891,662 B2 *  11/2014   Jeong .................... H04L 5/0051
                                                                     375/232
(Continued)

FOREIGN PATENT DOCUMENTS

KR   10-2017-0053076   5/2017
KR   10-2019-0103343   9/2019
(Continued)

OTHER PUBLICATIONS

PCT/ISA/210, International Search Report dated Feb. 9, 2022 issued in counterpart application No. PCT/KR2021/011769, 7 pages.
(Continued)

*Primary Examiner* — James M Perez
(74) *Attorney, Agent, or Firm* — The Farrell Law Firm, P, C, (57) ABSTRACT

Provided is a discrete Fourier transform (DFT)-spread orthogonal frequency division multiplexing (OFDM) transmission method and transmitter including a phase shifter configured to generate a pi/2-binary phase shift keying (BPSK) symbol vector by phase-shifting a vector including M BPSK symbols, a DFT spreader configured to generate a DFT-spread pi/2-BPSK symbol vector by spreading the pi/2-BPSK symbol vector using an M-point DFT matrix, a circular extender configured to generate a circularly extended pi/2-BPSK symbol vector by periodically extending the DFT-spread pi/2-BPSK symbol vector, a frequency domain spectrum shaper configured to generate a frequency domain spectrum shaped pi/2-BPSK symbol vector by multiplying each element of the circularly extended pi/2-BPSK symbol vector by each element of a first shaping vector, and a subcarrier allocator configured to allocate the frequency (Continued)

domain spectrum shaped pi/2-BPSK symbol vector to subcarriers in an allocated frequency range.

6 Claims, 9 Drawing Sheets

(58) Field of Classification Search
CPC ............. H04L 27/26362; H04L 27/264; H04L 27/26412; H04L 27/26416
See application file for complete search history.

(56) References Cited

U.S. PATENT DOCUMENTS

| | | | | |
|---|---|---|---|---|
| 9,088,979 | B2* | 7/2015 | Baldemair | H04W 72/21 |
| 9,191,080 | B2* | 11/2015 | Yokomakura | H04B 7/0413 |
| 9,813,276 | B2* | 11/2017 | Jungnickel | H04L 27/2644 |
| 9,893,919 | B2* | 2/2018 | Kim | H04L 27/2082 |
| 10,003,489 | B2* | 6/2018 | Zeng | H04L 27/2627 |
| 10,028,261 | B2* | 7/2018 | Baldemair | H04L 5/0019 |
| 10,212,007 | B2* | 2/2019 | Akande | H04L 27/01 |
| 10,517,079 | B2* | 12/2019 | Baldemair | H04J 11/005 |
| 10,680,870 | B2* | 6/2020 | Levinbook | H04L 27/2636 |
| 10,735,225 | B2* | 8/2020 | Kim | H04L 25/03834 |
| 11,108,608 | B2* | 8/2021 | Zhang | H04L 27/262 |
| 11,108,609 | B2* | 8/2021 | Levinbook | H04L 27/2607 |
| 11,172,473 | B2* | 11/2021 | Baldemair | H04W 72/21 |
| 11,283,657 | B2* | 3/2022 | Yun | H04L 27/22 |
| 11,343,040 | B2* | 5/2022 | Noh | H04L 5/0048 |
| 11,770,285 | B2* | 9/2023 | Ji | H04L 27/206 375/262 |
| 11,818,719 | B2* | 11/2023 | Baldemair | H04W 72/21 |
| 11,985,017 | B2* | 5/2024 | Kuchi | H04L 27/2613 |
| 2008/0318567 | A1* | 12/2008 | Popovic | H04W 56/0005 455/422.1 |
| 2011/0261858 | A1* | 10/2011 | Baldemair | H04L 5/0053 375/E1.001 |
| 2012/0099666 | A1* | 4/2012 | Baldemair | H04L 27/2617 375/260 |
| 2014/0185589 | A1* | 7/2014 | Baldemair | H04W 72/21 370/335 |
| 2015/0326358 | A1* | 11/2015 | Baldemair | H04J 11/005 370/329 |
| 2016/0080054 | A1* | 3/2016 | Yu | H04B 7/0456 370/280 |
| 2016/0308702 | A1* | 10/2016 | Ma | H04L 5/0007 |
| 2017/0134205 | A1* | 5/2017 | Kim | H04L 27/2623 |
| 2017/0164352 | A1* | 6/2017 | Yang | H04W 72/21 |
| 2018/0048512 | A1* | 2/2018 | Zeng | H04L 25/03834 |
| 2018/0241603 | A1* | 8/2018 | Jia | H04L 27/2614 |
| 2018/0323947 | A1* | 11/2018 | Brunel | H04L 5/1469 |
| 2018/0324005 | A1* | 11/2018 | Kim | H04L 27/2035 |
| 2018/0324794 | A1* | 11/2018 | Baldemair | H04W 72/21 |
| 2019/0158339 | A1* | 5/2019 | Park | H04L 27/3411 |
| 2019/0182092 | A1* | 6/2019 | Clarkson | H04L 27/2636 |
| 2019/0222455 | A1* | 7/2019 | Sahin | H04L 27/2613 |
| 2019/0268202 | A1* | 8/2019 | Levinbook | H04L 27/2614 |
| 2019/0335537 | A1* | 10/2019 | Moroga | H04W 72/51 |
| 2019/0379567 | A1* | 12/2019 | Kuchi | H04L 5/0016 |
| 2020/0036470 | A1* | 1/2020 | Olesen | H04L 27/0008 |
| 2020/0052947 | A1* | 2/2020 | Sahin | H04W 72/0453 |
| 2020/0112466 | A1* | 4/2020 | Yang | H04B 7/0408 |
| 2020/0120666 | A1* | 4/2020 | Baldemair | H04W 72/21 |
| 2020/0127801 | A1* | 4/2020 | Sengupta | H04L 27/262 |
| 2020/0204421 | A1* | 6/2020 | Levinbook | H04L 27/2607 |
| 2020/0267037 | A1* | 8/2020 | Nikopour | H04L 25/03834 |
| 2020/0328926 | A1* | 10/2020 | Hu | H04L 27/34 |
| 2021/0168002 | A1* | 6/2021 | Yun | H04L 27/0012 |
| 2022/0061046 | A1* | 2/2022 | Baldemair | H04L 5/0053 |
| 2023/0327930 | A1* | 10/2023 | Kuchi | H04L 27/2605 |
| 2023/0396479 | A1* | 12/2023 | Baldemair | G01S 7/006 |
| 2024/0015786 | A1* | 1/2024 | Tiirola | H04L 27/2614 |
| 2024/0214254 | A1* | 6/2024 | Cho | H04L 27/2636 |
| 2024/0414042 | A1* | 12/2024 | Cho | H04L 1/00 |

FOREIGN PATENT DOCUMENTS

| | | |
|---|---|---|
| KR | 10-2020-0058044 | 5/2020 |
| WO | WO 2011/087448 | 7/2011 |

OTHER PUBLICATIONS

PCT/ISA/237, Written Opinion dated Feb. 9, 2022 issued in counterpart application No. PCT/KR2021/011769, 3 pages.
Korean Notice of Allowance dated Jun. 27, 2023 issued in Korean Patent Application No. KR 10-2021-0116577, 11 pages.
Korean Final Office Action dated Jan. 25, 2023 issued in Korean Patent Application No. KR 10-2021-0116577, 5 pages.
Korean Office Action dated Jul. 18, 2022 issued in Korean Patent Application No. KR 10-2021-0116577, 33 pages.
Kim, Jubum et al., "Minimization of PAPR for DFT-Spread OFDM with BPSK Symbols", IEEE Transactions on Vehicular Technology, vol. 67, No. 12, pp. 11746-11758, Dec. 2018.

* cited by examiner

SPECTRUM SHAPING METHOD FOR GENERATING SIGNAL HAVING ALMOST CONSTANT ENVELOPE IN COMMUNICATION SYSTEM, AND TRANSMITTER PERFORMING SAME

TECHNICAL FIELD

The disclosure relates to communication systems, and more particularly, to a spectrum shaping method of a discrete Fourier transform (DFT)-spread orthogonal frequency division multiplexing (OFDM) transmitter and the transmitter for performing the method.

BACKGROUND ART

In fourth generation (4G) mobile communication, discrete Fourier transform (DFT)-spread orthogonal frequency division multiplexing (OFDM), which is a type of localized single-carrier frequency division multiple access (SC-FDMA), was adopted as an uplink (UL) standard to attain low UL peak-to-average power ratio (PAPR) performance. The low PAPR performance of the DFT-spread OFDM as compared to OFDM increases the efficiency of a power amplifier of a transmitter, thereby providing wider cell coverage. In fifth generation (5G) mobile communication, orthogonal frequency division multiple access (OFDMA) was added for UL but the traditional DFT-spread OFDM was adopted for low PAPR performance. Especially, the DFT-spread OFDM adopted in the 5G mobile communication supports pi/2-binary phase shift keying (BPSK) symbol and spectrum shaping to further enhance the PAPR performance as compared to the 4G mobile communication. Later on, the standard was enhanced to support the pi/2-BPSK symbol and spectrum shaping even for the 4G mobile communication.

The aim of massive machine type communications (mMTC), one of the scenarios for use of the 5G mobile communication, includes supporting connections between numerous low-cost low-power transceivers and mobile communication networks, and the transceiver may use a low-cost highly nonlinear amplifier for signal transmission to save cost and power. However, the DFT-spread OFDM adopted in the 5G mobile communication, which uses pi/2-BPSK symbols and spectrum shaping, has not yet had enough PAPR performance to use the low-cost highly linear amplifier. Hence, a transmission method by which a transmitter generates an almost constant envelope signal to further enhance the PAPR performance and is as compatible with a receiver of the mobile communication standard as possible is needed to enhance the traditional OFDM based standard as well as develop a future standard.

A method of generating the almost constant envelope signal in the DFT-spread OFDM that uses pi/2-BPSK symbols and spectrum shaping may be applied not only to the transmitter in the mobile communication system but also to various wired or wireless transmitters.

PRIOR ART LITERATURE

Korea Patent Publication No. 10-2018-0142539 (published on Nov. 19, 2018)

DISCLOSURE

Technical Problem

To solve the aforementioned problem, the disclosure aims to provide a method by which a discrete Fourier transform (DFT)-spread orthogonal frequency division multiplexing (OFDM) transmitter that uses pi/2-binary phase shift keying (BPSK) symbols and spectrum shaping models a frequency domain spectrum shaping vector to generate an almost constant envelope signal and the transmitter for performing the method.

However, the objective of the disclosure is not limited thereto, but may be extended in various ways without departing from the spirit and scope of the disclosure.

Technical Solution

According to an embodiment of the disclosure, a discrete Fourier transform (DFT)-spread orthogonal frequency division multiplexing (OFDM) transmitter includes a phase shifter configured to generate a pi/2-binary phase shift keying (BPSK) symbol vector $\underline{d}$ by phase-shifting a vector $\underline{b}$ including M BPSK symbols, a DFT spreader configured to generate a DFT-spread pi/2-BPSK symbol vector $\underline{x}$ by spreading the pi/2-BPSK symbol vector $\underline{d}$ by using an M-point DFT matrix $W_M$, a circular extender configured to generate a circularly extended pi/2-BPSK symbol vector $\underline{y}$ by periodically extending the DFT-spread pi/2-BPSK symbol vector $\underline{x}$, a frequency domain spectrum shaper configured to generate a frequency domain spectrum shaped pi/2-BPSK symbol vector $\underline{z}$ by multiplying each element of the circularly extended pi/2-BPSK symbol vector $\underline{y}$ by each element of a first shaping vector $\underline{s}_T$, and a subcarrier allocator configured to allocate the frequency domain spectrum shaped pi/2-BPSK symbol vector $\underline{z}$ to subcarriers in an allocated frequency range.

According to an aspect, the frequency domain spectrum shaper may generate the frequency domain spectrum shaped pi/2-BPSK symbol vector $\underline{z}$ by obtaining Hadamard product of the circularly extended pi/2-BPSK symbol vector $\underline{y}$ and the first shaping vector $\underline{s}_T$, wherein the first shaping vector $\underline{s}_T$ may be determined depending on M and a number L of the subcarriers to be used.

According to an aspect, an I-th element of the first shaping vector $\underline{s}_T$ may be determined to be a value obtained by equidistant sampling of continuous-time Fourier transform of minimum shift keying (MSK) waveform defined by the following equation:

$$P(f) = \text{sinc}\left(-2f + \frac{1}{2}\right) + \text{sinc}\left(2f + \frac{1}{2}\right)$$

wherein the value is a sampled value at a certain location defined by the following equation $$s_{T,l} \triangleq \text{sinc}\left(\frac{-2l+L+2}{M} + \frac{1}{2}\right) + \text{sinc}\left(\frac{2l-L-2}{M} + \frac{1}{2}\right)$$

where I=1, 2, . . . , L.

According to an aspect, the number L of the subcarriers may be determined by the following equation $$L = \left(k + \frac{1}{2}\right)M$$

where k is any natural number.

According to an aspect, the frequency domain spectrum shaper may perform frequency domain spectrum shaping with a second shaping vector $\underline{s}_{T2}$ generated by obtaining Hadamard product of the first shaping vector $\underline{s}_T$ and a window vector $\underline{w}$ of one of Hamming, Hanning, Keiser, Gaussian, Tukey, Blackmann and Dolph-Chebyshev.

According to an embodiment of the disclosure, a discrete Fourier transform (DFT)-spread orthogonal frequency division multiplexing (OFDM) transmission method performed by a DFT-spread OFDM transmitter includes generating a pi/2 binary phase shift keying (BPSK) symbol vector $\underline{d}$ by phase-shifting a vector $\underline{b}$ including M BPSK symbols, generating a DFT-spread pi/2-BPSK symbol vector $\underline{x}$ by spreading the pi/2-BPSK symbol vector $\underline{d}$ by using an M-point DFT matrix $W_M$, generating a circularly extended pi/2-BPSK symbol vector $\underline{y}$ by periodically extending the DFT-spread pi/2-BPSK symbol vector $\underline{z}$, generating a frequency domain spectrum shaped pi/2-BPSK symbol vector $\underline{z}$ by multiplying each element of the circularly extended pi/2-BPSK symbol vector $\underline{y}$ by each element of a first shaping vector $\underline{s}_T$, and allocating the frequency domain spectrum shaped pi/2-BPSK symbol vector $\underline{z}$ to subcarriers in an allocated frequency range.

According to an aspect, the generating of the frequency domain spectrum shaped pi/2-BPSK symbol vector $\underline{z}$ may include generating the frequency domain spectrum shaped pi/2-BPSK symbol vector $\underline{z}$ by obtaining Hadamard product of the circularly extended pi/2-BPSK symbol vector $\underline{y}$ and the first shaping vector $\underline{s}_T$, wherein the first shaping vector $\underline{s}_T$ may be determined depending on M and a number L of the subcarriers to be used.

According to an aspect, an I-th element of the first shaping vector $\underline{s}_T$ may be determined to be a value obtained by equidistant sampling of continuous-time Fourier transform of minimum shift keying (MSK) waveform defined by the following equation $$P(f) = \text{sinc}\left(-2f + \frac{1}{2}\right) + \text{sinc}\left(2f + \frac{1}{2}\right)$$

wherein the value is a sampled value at a certain location defined by the following equation $$s_{T,l} \triangleq \text{sinc}\left(\frac{-2l+L+2}{M} + \frac{1}{2}\right) + \text{sinc}\left(\frac{2l-L-2}{M} + \frac{1}{2}\right)$$

where I=1, 2, . . . , L.

According to an aspect, the number L of the subcarriers may be determined by the following equation $$L = \left(k + \frac{1}{2}\right)M$$

where k is an arbitrary natural number.

According to an aspect, the generating of the frequency domain spectrum shaped pi/2-BPSK symbol vector $\underline{z}$ may include performing frequency domain spectrum shaping with a second shaping vector $\underline{s}_{T2}$ generated by obtaining Hadamard product of the first shaping vector $\underline{s}_T$ and a window vector $\underline{w}$ of one of Hamming, Hanning, Keiser, Gaussian, Tukey, Blackmann and Dolph-Chebyshev.

Advantageous Effects

The disclosure may have the following technological effects. However, it does not mean that a certain embodiment should have all or only the following effects, so the technological scope of the disclosure should not be understood as being limited thereto.

According to the aforementioned embodiments of the disclosure, a discrete Fourier transform (DFT)-spread orthogonal frequency division multiplexing (OFDM) transmitter and transmission method may provide a frequency domain spectrum shaping vector for the DFT-spread OFDM transmitter of a communication system to reduce distortion caused by using a non-linear power amplifier, which may be received by a receiver compatible with a current mobile communication standard. Furthermore, it may dramatically improve a peak-to-average power ratio (PAPR) by generating a signal having an almost constant envelope.

MODE FOR INVENTION

Various modifications may be made to embodiments of the disclosure, which will be described more fully hereinafter with reference to the accompanying drawings.

The disclosure should be understood as not limited to particular embodiments but including all the modifications, equivalents and replacements which belong to technical scope and ideas of the disclosure.

Terms like 'first', 'second', etc., may be used to indicate various components, but the components should not be restricted by the terms. These terms are only used to distinguish one component from another component. For example, a first element may be termed a second element and, similarly, a second element may be termed a first element without departing from the scope of the disclosure.

It will be understood that, when a component is referred to as being "connected to/with" or "coupled to/with" another component, it can be directly connected to or coupled with the other component, or it can be indirectly connected to or coupled with the other component by having an intervening component interposed therebetween. On the other hand, when a component is referred to as being "directly coupled to/with" or "directly connected to/with" another component, no other components exist therebetween.

The terminology used herein is for the purpose of describing particular embodiments only and is not intended to limit the disclosure. An expression used in the singular encompasses the expression of the plural, unless it has a clearly different meaning in the context. It will be further understood that the terms "comprises" and/or "comprising," when used in this specification, specify the presence of stated features, numbers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by those of ordinary skill in the art to which the disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the disclosure will now be described clearly and in detail for those of ordinary skill in the art to which the disclosure belongs to easily practice them with reference to accompanying drawings.

Figure 1:
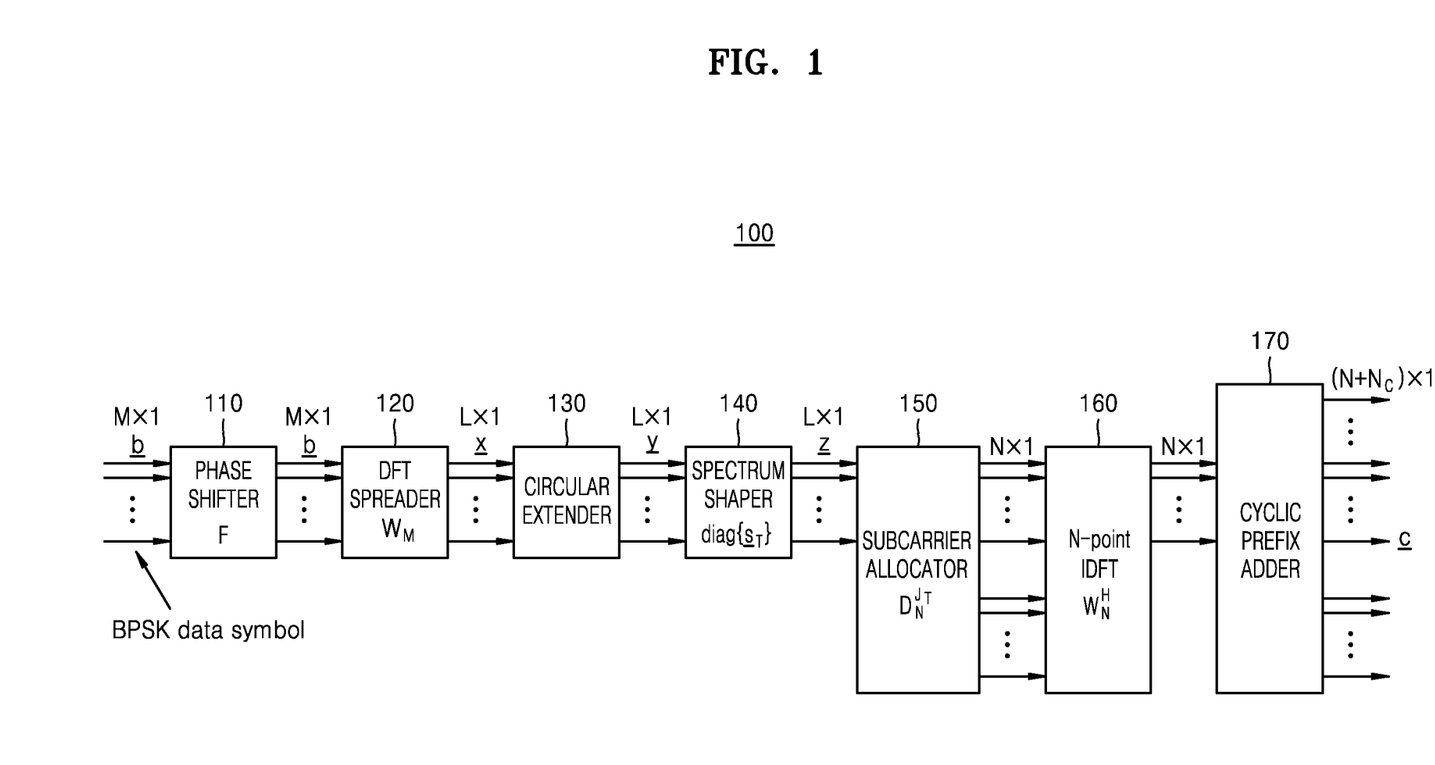
FIG. 1 is a block diagram illustrating a configuration of a discrete Fourier transform (DFT)-spread orthogonal frequency division multiplexing (OFDM) transmitter, according to an embodiment of the disclosure.
Figure 2:
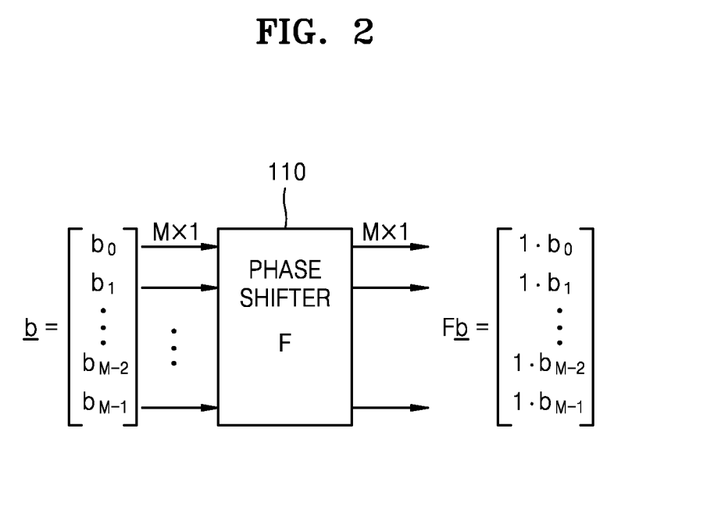
FIG. 2 is a block diagram illustrating a phase shifter of FIG. 1 in detail.
Figure 3:
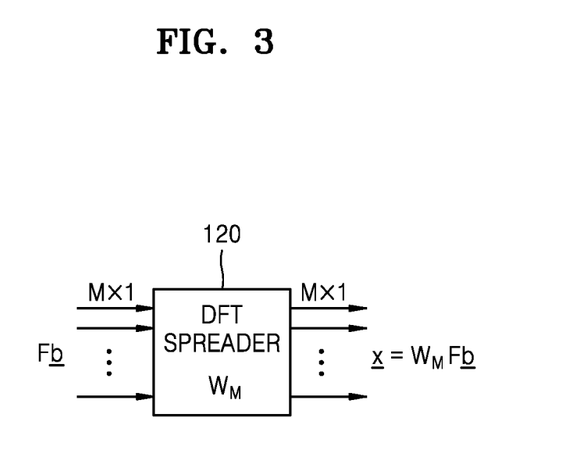
FIG. 3 is a block diagram illustrating a DFT spreader of FIG. 1 in detail.
Figure 4:
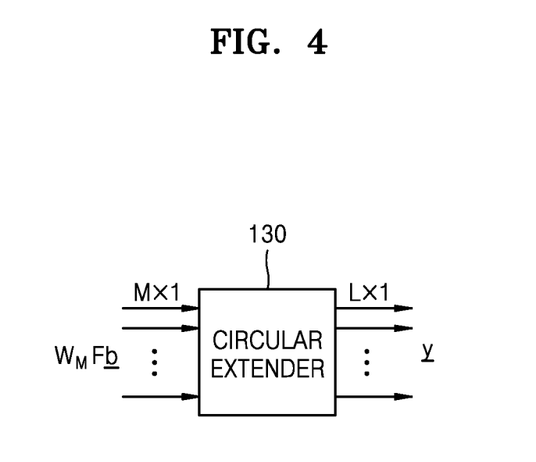
FIG. 4 is a block diagram illustrating a circular extender of FIG. 1 in detail.
Figure 5:
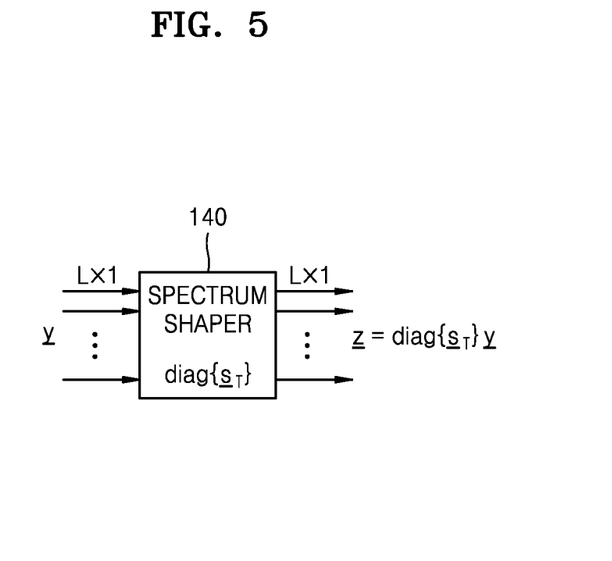
FIG. 5 is a block diagram illustrating a frequency domain spectrum shaper of FIG. 1 in detail.
Figure 6:
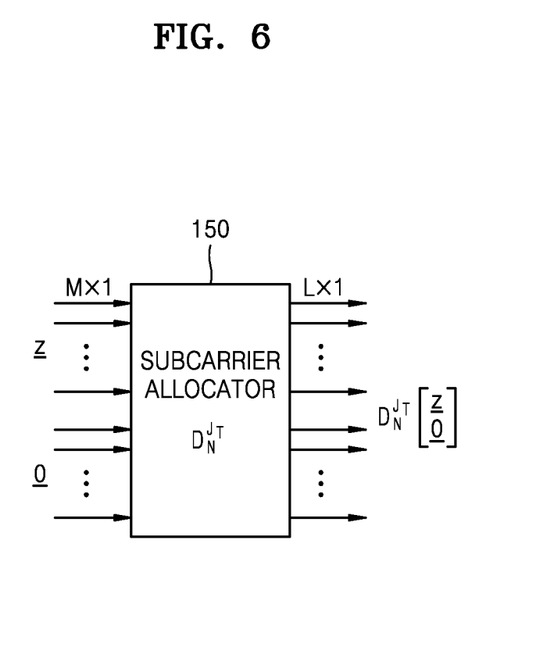
FIG. 6 is a block diagram illustrating a subcarrier allocator of FIG. 1 in detail.

FIG. 1 is a block diagram illustrating a configuration of a discrete Fourier transform (DFT)-spread orthogonal frequency division multiplexing (OFDM) transmitter, according to an embodiment of the disclosure, FIG. 2 is a block diagram illustrating a phase shifter of FIG. 1 in detail, FIG. 3 is a block diagram illustrating a DFT spreader of FIG. 1 in detail, FIG. 4 is a block diagram illustrating a circular extender of FIG. 1 in detail, FIG. 5 is a block diagram illustrating a frequency domain spectrum shaper of FIG. 1 in detail, and FIG. 6 is a block diagram illustrating a subcarrier allocator of FIG. 1 in detail.

As shown in FIG. 1, a DFT-spread OFDM transmitter 100 according to an embodiment of the disclosure may include a phase shifter 110, a DFT spreader 120, a circular extender 130, a frequency domain spectrum shaper 140, a subcarrier allocator 150, an N-point inverse discrete Fourier transformer (N-point IDFT) 160 and a cyclic prefix adder 170.

The phase-shifter 110 generates a pi/2-binary phase shift keying (BPSK) symbol vector $\underline{d}$ by phase-shifting a vector $\underline{b}$ including M binary phase shift keying (BPSK) symbols. As shown in FIG. 2, the pi/2-BPSK symbol vector $\underline{d}$ may be calculated as $\underline{d}=F\underline{b}$, and a diagonal matrix F may be defined by Equation 1:

$$F \triangleq \text{diag}\{[1, j, 1, j \ldots ]\} \quad \text{[Equation 1]}$$

where j is a square root of $-1$ and should not be mixed up with index j included in equations below. The diagonal matrix F does not have to have only 1s and js as diagonal elements as long as an I-th diagonal element and (I+1)-th diagonal element hold a phase difference of $+90°$ or $-90°$. The phase shift may be performed by obtaining Hadamard product of vector $\underline{b}$ and a vector having the diagonal elements of the diagonal matrix F.

The DFT spreader 120 generates a DFT-spread pi/2-BPSK symbol vector $\underline{x}$ by spreading the pi/2-BPSK symbol vector $\underline{d}$ by using an M-point DFT matrix $W_M$. As shown in FIG. 3, the DFT-spread pi/2-BPSK symbol vector $\underline{x}$ may be calculated as $W_M F\underline{b}$, and element (i, j) of the M-point DFT matrix $W_M$ may be defined by Equation 2:

$$[W_M]_{(i,j)} = \frac{1}{\sqrt{M}} e^{-j\frac{2\pi}{M}(i-1)(j-1)} \quad \text{[Equation 2]}$$

where the indexes i and j satisfy the terms of $1 \le i \le M$ and $1 \le j \le M$, respectively.

The circular extender 130 generates a circularly extended pi/2-BPSK symbol vector $\underline{y}$ having a length of L by periodically extending the DFT-spread pi/2-BPSK symbol vector $\underline{x}$. Specifically, when L is an integer multiple of M, the circular extender 130 may generate a circularly extended pi/2-BPSK symbol vector $\underline{y}$ having a length of L by repeating the DFT-spread pi/2-BPSK symbol vector $\underline{x}$ as many times as the integer, and when L is not the integer multiple of M, the circular extender 130 may generate a circularly extended pi/2-BPSK symbol vector $\underline{y}$ having a length of L by extending the DFT-spread pi/2-BPSK symbol vector $\underline{x}$ by repeating it as many times as a natural number r equal to or greater than a number obtained by rounding up L/M, and then cutting off front and back elements of a result of the extension. For example, the circular extender 130 may generate a circularly extended pi/2-BPSK symbol vector $\underline{y}$ having a length of L by cutting off first (rM−L)/2 elements and last (rM−L)/2 elements when (rM−L) is an even number.

The frequency domain spectrum shaper 140 generates a frequency domain spectrum shaped pi/2-BPSK symbol vector $\underline{z}$ by multiplying each element of the circularly extended pi/2-BPSK symbol vector $\underline{y}$ by each element of a first shaping vector $\underline{s}_T$. In other words, as shown in FIG. 5, the frequency domain spectrum shaper 140 may generate the frequency domain spectrum shaped pi/2-BPSK symbol vector $\underline{z}$ by obtaining Hadamard product of the first shaping vector $\underline{s}_T$ and the circularly extended pi/2-BPSK symbol vector $\underline{y}$. The first shaping vector $\underline{s}_T$ may be defined by Equation 3:

$$\underline{s}_T = \begin{bmatrix} s_{T,1} \\ s_{T,2} \\ \vdots \\ s_{T,L} \end{bmatrix} \quad \text{[Equation 3]}$$

The first shaping vector $\underline{s}_T$ may be determined according to M and the number L of subcarriers to be used, and an I-th element of the first shaping vector $\underline{s}_T$, where I=1, 2, ..., L, may be determined to be a value obtained by equidistantly sampling continuous-time Fourier transform of the minimum shift keying (MSK) waveform defined by Equation 4 at a certain position defined by Equation 5.

$$P(f) = \text{sinc}\left(-2f + \frac{1}{2}\right) + \text{sinc}\left(2f + \frac{1}{2}\right) \quad \text{[Equation 4]}$$

$$s_{T,I} \triangleq \text{sinc}\left(\frac{-2I + L + 2}{M} + \frac{1}{2}\right) + \text{sinc}\left(\frac{2I - L - 2}{M} + \frac{1}{2}\right) \quad \text{[Equation 5]}$$

where function sin c(x) is defined as $\sin(\pi x)/(\pi x)$ when x is not 0 and defined as 1 when x is 0.

In the meantime, when L is not an integer multiple of M, the circular extender 130 may generate a circularly extended vector by repeating the DFT-spread pi/2-BPSK symbol vector $\underline{x}$ as many times as a natural number r equal to or greater than a number obtained by rounding up L/M, and the frequency domain spectrum shaper 140 may extend the length of the circularly extended vector to rM by adding (rM−L)/2 zeros in the first shaping vector $\underline{s}_T$ to the front and back of the circularly extended vector, and use this to perform frequency domain spectrum shaping. In this case, a frequency domain spectrum shaped pi/2-BPSK symbol vector $\underline{z}$ having a length of L may be generated by cutting off parts to which the zeros are added after the frequency domain spectrum shaping. The number L of subcarriers may be defined by Equation 6 using an arbitrary natural number k:

$$L = \left(k + \frac{1}{2}\right)M \quad \text{[Equation 6]}$$

The frequency domain spectrum shaper 140 may perform frequency domain spectrum shaping with a second shaping vector $\underline{s}_{T2}$ generated by obtaining Hadamard product of the first shaping vector $\underline{s}_T$ and a window vector $\underline{w}$ of one of Hamming, Hanning, Keiser, Gaussian, Tukey, Blackmann and Dolph-Chebyshev. This may enhance such characteristics as out-of-band emission (OOBE), intersymbol interference (ISI), or the like.

The subcarrier allocator 150 allocates the frequency domain spectrum shaped pi/2-BPSK symbol vector $\underline{z}$ to subcarriers in an allocated frequency range. As shown in FIG. 6, allocation to the subcarrier may be performed by multiplying the frequency domain spectrum shaped pi/2-BPSK symbol vector $\underline{z}$ by a downward circular matrix $D_N^{J_T}$ and element (i, j) of a unit downward circular matrix $D_N$ may be defined by Equation 7:

$$[D_N]_{(i,j)} \triangleq \begin{cases} 1, & \text{for } i = \text{mod}\{j, N\} + 1 \\ 0, & \text{elsewhere} \end{cases} \quad \text{[Equation 7]}$$

where N is a size of a DFT matrix to be used by the N-point IDFT 160, and mod is a modulo operation. Indexes i and j satisfy the terms of 1≤i≤N and 1≤j≤N, respectively.

When the allocated subcarriers correspond to (J+1)-th to (J+M)-th subcarriers, an exponent of the downward circular matrix $D_N^{J_T}$ which is also an amount to be circularly downshifted, $J_T$, may be defined by Equation 8:

$$J_T \triangleq J - \frac{L - M}{2} \quad \text{[Equation 8]}$$

The DFT-spread, circularly extended, frequency domain spectrum shaped and subcarrier-allocated pi/2-BPSK symbol vector passes through the N-point IDFT 160 and the cyclic prefix adder 170 to be a DFT-spread OFDM transmission signal $\underline{c}$. Operations of the N-point IDFT 160 and the cyclic prefix adder 170 are widely known technologies in the art to which the disclosure belongs, so the description thereof will be omitted in the specification.

Hereinafter, a DFT-spread OFDM transmission method according to an embodiment of the disclosure, which may be performed by the DFT-spread OFDM transmitter shown in FIG. 1, will now be described.

Figure 7:
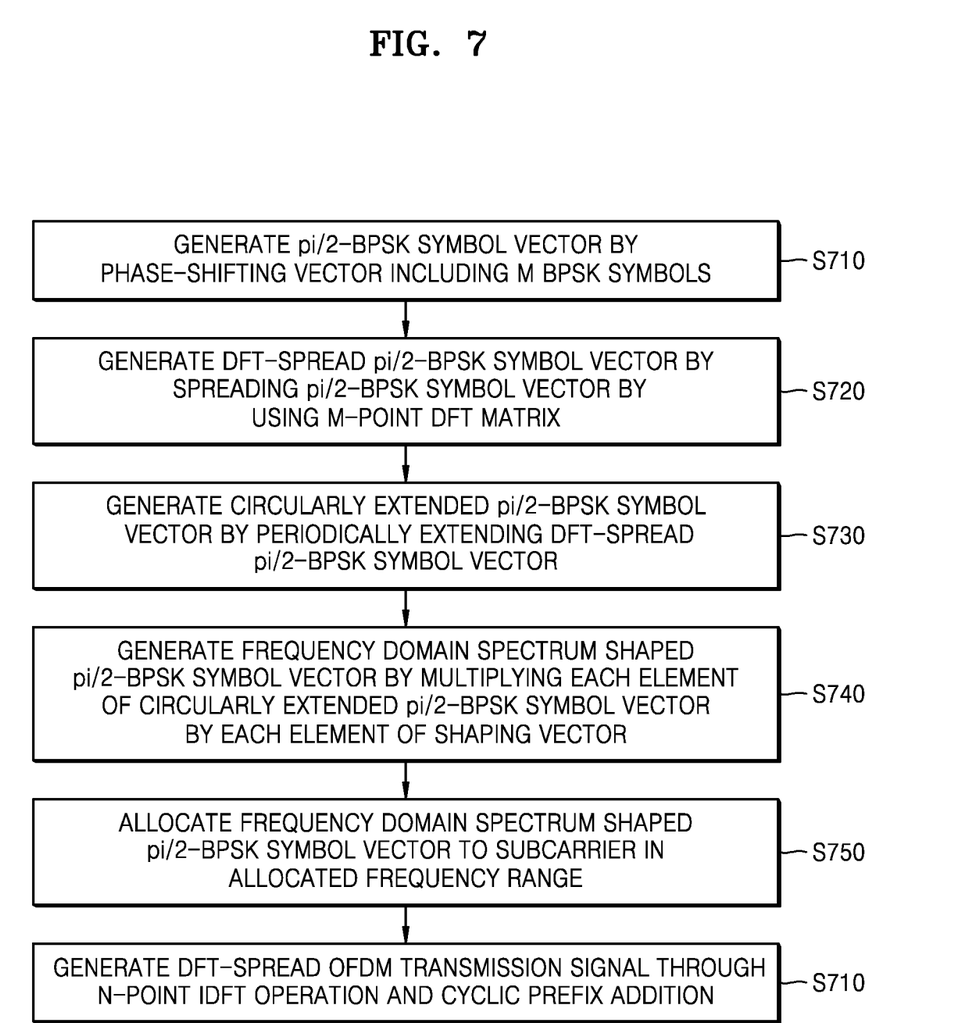
FIG. 7 is a flowchart of a DFT-spread OFDM transmission method, according to an embodiment of the disclosure.

FIG. 7 is a flowchart of a DFT-spread OFDM transmission method, according to an embodiment of the disclosure.

Referring to FIG. 7, in operation S710, a pi/2-BPSK symbol vector $\underline{d}$ is generated by phase-shifting a vector $\underline{b}$ including M BPSK symbols. The pi/2-BPSK symbol vector $\underline{d}$ may be calculated as $\underline{d} = F\underline{b}$, and a diagonal matrix F may be defined by Equation 1.

In operation S720, a DFT-spread pi/2-BPSK symbol vector $\underline{x}$ is generated by spreading the pi/2-BPSK symbol vector $\underline{d}$ using an M-point DFT matrix $W_M$. The DFT-spread pi/2-BPSK symbol vector $\underline{x}$ may be calculated as $W_M F\underline{b}$, and element (i, j) of the M-point DFT matrix $W_M$ may be defined by Equation 2.

In operation S730, a circularly extended pi/2-BPSK symbol vector $\underline{y}$ is generated by periodically extending the DFT-spread pi/2-BPSK symbol vector $\underline{x}$. Specifically, in operation S730, when L is an integer multiple of M, a circularly extended pi/2-BPSK symbol vector $\underline{y}$ having a length of L may be generated by repeating the DFT-spread pi/2-BPSK symbol vector $\underline{x}$ as many times as the integer, and when L is not the integer multiple of M, a circularly extended pi/2-BPSK symbol vector $\underline{y}$ having a length of L may be generated by extending the DFT-spread pi/2-BPSK symbol vector $\underline{x}$ by repeating it as many times as a natural number r equal to or greater than a number obtained by rounding up L/M, and then cutting off front and back elements of a result of the extension. For example, the circular extender 130 may generate a circularly extended pi/2-BPSK symbol vector $\underline{y}$ having a length of L by cutting off first (rM−L)/2 elements and last (rM−L)/2 elements when (rM−L) is an even number. For example, in operation S730, a circularly extended pi/2-BPSK symbol vector $\underline{y}$ having a length of L may be generated by cutting off first (rM−L)/2 elements and last (rM−L)/2 elements when (rM−L) is an even number.

In operation S740, a frequency domain spectrum shaped pi/2-BPSK symbol vector $\underline{z}$ is generated by multiplying each element of the circularly extended pi/2-BPSK symbol vector $\underline{y}$ by each element of the first shaping vector $\underline{s}_T$. In other words, in operation S740, the frequency domain spectrum shaped pi/2-BPSK symbol vector $\underline{z}$ may be generated by obtaining Hadamard product of the first shaping vector $\underline{s}_T$ and the circularly extended pi/2-BPSK symbol vector $\underline{y}$. The first shaping vector $\underline{s}_T$ may be defined by Equation 3.

The first shaping vector $\underline{s}_T$ may be determined according to M and the number L of subcarriers to be used, and an I-th element (where I=1, 2, . . . , L) of the first shaping vector $\underline{s}_T$ may be determined to be a value obtained by equidistantly sampling continuous-time Fourier transform of the MSK waveform defined by Equation 4 at a particular position defined by Equation 5.

In the meantime, when L is not an integer multiple of M, in operation S730, a circularly extended vector may be generated by repeating the DFT-spread pi/2-BPSK symbol vector $\underline{x}$ as many times as a natural number r equal to or greater than a number obtained by rounding up L/M, and in operation S740, frequency domain spectrum shaping may be performed by using a result of increasing the length of the circularly extended vector to rM by adding (rM−L)/2 zeros in the first shaping vector $\underline{s}_T$ to the front and back of the circularly extended vector. In this case, a frequency domain spectrum shaped pi/2-BPSK symbol vector $\underline{z}$ having a length of L may be generated by cutting off parts to which the zeros are added after the frequency domain spectrum shaping. The number L of subcarriers may be defined by Equation 6 using an arbitrary natural number k.

In operation S750, the frequency domain spectrum shaped pi/2-BPSK symbol vector $\underline{z}$ is allocated to subcarriers in an allocated frequency range. Allocation to the subcarrier may be performed by multiplying the frequency domain spectrum shaped pi/2-BPSK symbol vector $\underline{z}$ by a downward circular matrix $D_N^{J_T}$, and element (i, j) of a unit downward circular matrix $D_N$ may be defined by Equation 7.

When the allocated subcarriers correspond to (J+1)-th to (J+M)-th subcarriers, an exponent of the downward circular matrix $D_N^{J_T}$, which is also an amount to be circularly downshifted, $J_T$, may be defined by Equation 8.

In operation S760, the DFT-spread, circularly extended, frequency domain spectrum shaped and subcarrier-allocated pi/2-BPSK symbol vector passes through the N-point IDFT 160 and the cyclic prefix adder 170 to be a DFT-spread OFDM transmission signal $\mathcal{C}$.

Figure 8:
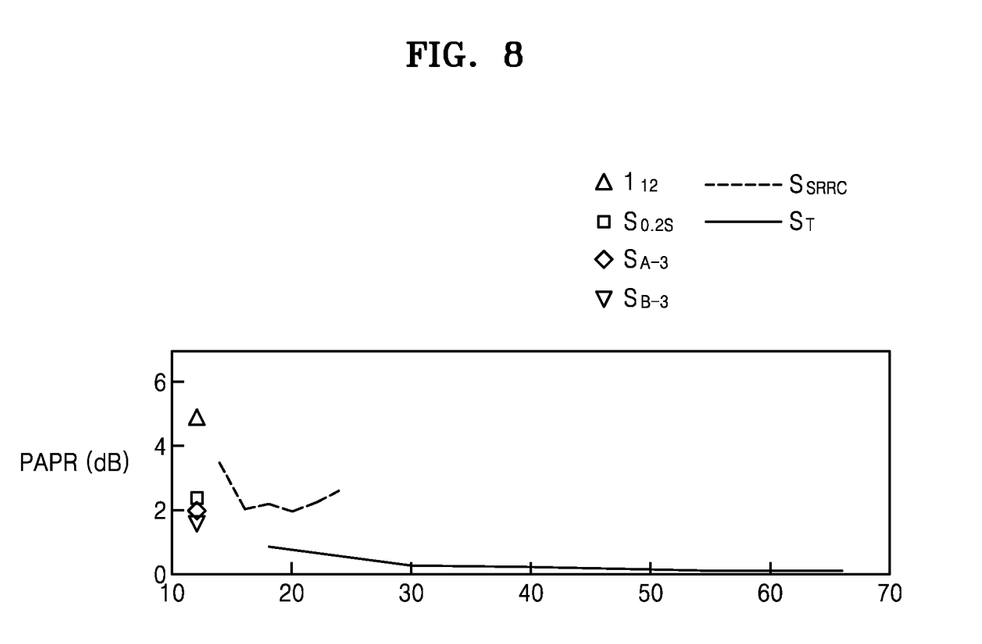
FIG. 8 is a graph representing comparison of peak-to-average power ratio (PAPR) performance depending on excess subcarriers of a DFT-spread OFDM transmitter, according to an embodiment of the disclosure.

FIG. 8 is a graph representing comparison of peak-to-average power ratio (PAPR) performance depending on excess subcarriers of a DFT-spread OFDM transmitter, according to an embodiment of the disclosure.

In FIG. 8, PAPR performance of the DFT-spread OFDM transmission signal $\mathcal{C}$ depending on used subcarriers is shown when a BPSK symbol vector having a length of 12 is transmitted. According to FIG. 8, the DFT-spread OFDM transmitter according to an embodiment of the disclosure has a lower PAPR than that of the traditional DFT-spread OFDM transmitter when L=18, and has PAPR performance of almost 0 dB when L is 30 or more. This means that an almost constant envelope signal is generated.

Figure 9:
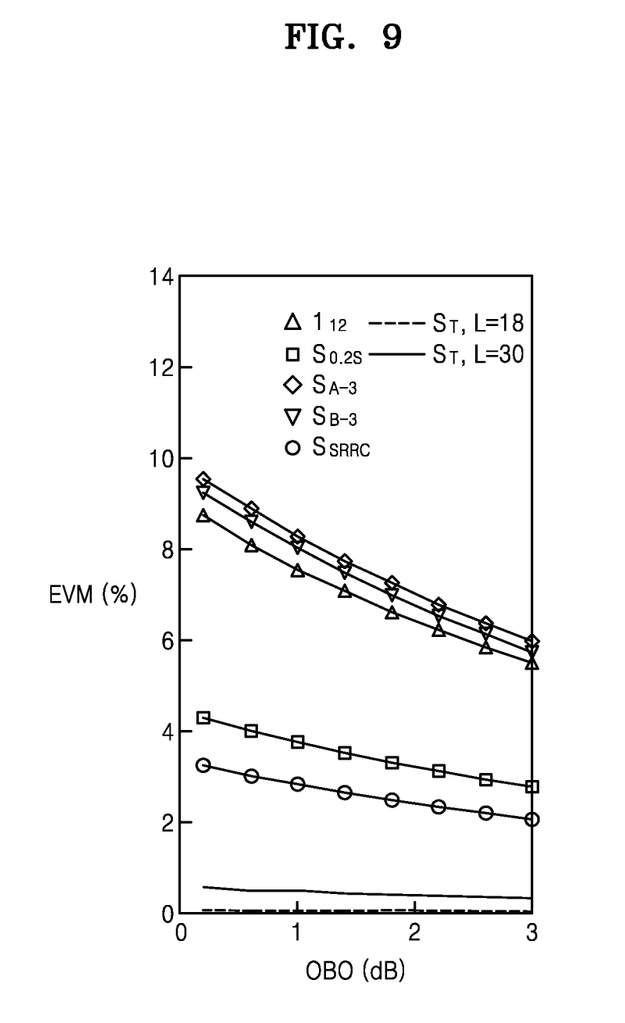
FIG. 9 is a graph representing comparison of error vector magnitude performance depending on output backoffs of a nonlinear power amplifier of a DFT-spread OFDM transmitter, according to an embodiment of the disclosure.

FIG. 9 is a graph representing comparison of error vector magnitude (EVM) performance depending on output backoffs of a nonlinear power amplifier of a DFT-spread OFDM transmitter, according to an embodiment of the disclosure.

In FIG. 9, EVM performance of when a DFT-spread OFDM transmission signal $\mathcal{C}$ generated when a BPSK symbol vector having a length of 12 is transmitted has passed the non-linear power amplifier is shown depending on output backoffs. According to FIG. 9, the DFT-spread OFDM transmitter according to an embodiment of the disclosure has better EVM performance than that of the traditional DFT-spread OFDM transmitter when L=18, and has EVM performance of almost 0 when L is 30 or more.

Although the disclosure is described with reference to accompanying drawings and embodiments, the scope of the disclosure is not limited thereto, and those of ordinary skill in the art may appreciate that various modifications and changes to the disclosure can be made without deviating from the idea and scope of the appended claims below.

EXPLANATION OF REFERENCE NUMERALS DESIGNATING THE MAJOR

100: DFT-spread OFDM transmitter
110: phase shifter
120: DFT spreader
130: circular extender
140: frequency domain spectrum shaper
150: subcarrier allocator
160: N-point IDFT
170: cyclic prefix adder

The invention claimed is:

1. A discrete Fourier transform (DFT)-spread orthogonal frequency division multiplexing (OFDM) transmitter comprising:
   a phase shifter configured to generate a pi/2-binary phase shift keying (BPSK) symbol vector $\underline{d}$ by phase-shifting a vector $\underline{b}$ including M BPSK symbols;
   a DFT spreader configured to generate a DFT-spread pi/2-BPSK symbol vector $\underline{x}$ by spreading the pi/2-BPSK symbol vector $\underline{d}$ by using an M-point DFT matrix $W_M$;
   a circular extender configured to generate a circularly extended pi/2-BPSK symbol vector $\underline{y}$ by periodically extending the DFT-spread pi/2-BPSK symbol vector $\underline{x}$,
   a frequency domain spectrum shaper configured to generate a frequency domain spectrum shaped pi/2-BPSK symbol vector $\underline{z}$ by multiplying each element of the circularly extended pi/2-BPSK symbol vector $\underline{y}$ by each element of a first shaping vector $\underline{s_T}$;
   a subcarrier allocator configured to allocate the frequency domain spectrum shaped pi/2-BPSK symbol vector $\underline{z}$ to subcarriers in an allocated frequency range; and
   an inverse DFT (IDFT) unit and a cyclic prefix (CP) adder configured to generate a DFT-spread OFDM transmission signal by performing an IDFT and inserting a CP to the pi/2-BPSK symbol vector $\underline{z}$ allocated to the subcarriers,
   wherein the frequency domain spectrum shaped pi/2-BPSK symbol vector $\underline{z}$ is obtained by performing a Hadamard product of the circularly extended pi/2-BPSK symbol vector $\underline{y}$ and the first shaping vector $\underline{s_T}$,
   wherein the first shaping vector $\underline{s_T}$ is determined according to the M and a number L of the subcarriers to be used,
   wherein an l-th element of the first shaping vector $\underline{s_T}$ is determined to be a value obtained by equidistant sampling of continuous-time Fourier transform of a minimum shift keying (MSK) waveform defined by the following equation:

$$P(f) = \mathrm{sinc}\left(-2f + \frac{1}{2}\right) + \mathrm{sinc}\left(2f + \frac{1}{2}\right)$$

and
   wherein the value is a sampled value at a certain location defined by the following equation $$s_{T,l} \triangleq \mathrm{sinc}\left(\frac{-2l+L+2}{M} + \frac{1}{2}\right) + \mathrm{sinc}\left(\frac{2l-L-2}{M} + \frac{1}{2}\right)$$

where l=1, 2, . . . , L.

2. The DFT-spread OFDM transmitter of claim 1, wherein the number L of the subcarriers is determined by the following equation $$L = \left(k + \frac{1}{2}\right)M$$

where k is an arbitrary natural number.

3. The DFT-spread OFDM transmitter of claim 1, wherein the frequency domain spectrum shaper is configured to perform frequency domain spectrum shaping with a second shaping vector $\underline{s_{T2}}$ generated by obtaining a Hadamard product of the first shaping vector $\underline{s_T}$ and a window vector $\underline{w}$ of one of Hamming, Hanning, Keiser, Gaussian, Tukey, Blackmann and Dolph-Chebyshev.

4. A discrete Fourier transform (DFT)-spread orthogonal frequency division multiplexing (OFDM) transmission method performed by a DFT-spread OFDM transmitter, the DFT-spread OFDM transmission method comprising:
   generating a pi/2-binary phase shift keying (BPSK) symbol vector $\underline{d}$ by phase-shifting a vector $\underline{b}$ including M BPSK symbols;
   generating a DFT-spread pi/2-BPSK symbol vector $\underline{x}$ by spreading the pi/2-BPSK symbol vector $\underline{d}$ by using an M-point DFT matrix $W_M$;

generating a circularly extended pi/2-BPSK symbol vector $\underline{y}$ by periodically extending the DFT-spread pi/2-BPSK symbol vector $\underline{x}$, generating a frequency domain spectrum shaped pi/2-BPSK symbol vector $\underline{z}$ by multiplying each element of the circularly extended pi/2-BPSK symbol vector $\underline{y}$ by each element of a first shaping vector $\underline{s}_T$; and allocating the frequency domain spectrum shaped pi/2-BPSK symbol vector $\underline{z}$ to subcarriers in an allocated frequency range; and generating a DFT-spread OFDM transmission signal by performing an inverse DFT (IDFT) and inserting a cyclic prefix (CP) to the pi/2-BPSK symbol vector allocated to the subcarriers, wherein the frequency domain spectrum shaped pi/2-BPSK symbol vector $\underline{z}$ is obtained by performing a Hadamard product of the circularly extended pi/2-BPSK symbol vector $\underline{y}$ and the first shaping vector $\underline{s}T$, wherein the first shaping vector $\underline{s}T$ is determined according to the M and a number L of the subcarriers to be used, wherein an l-th element of the first shaping vector $\underline{s}_T$ is determined to be a value obtained by equidistant sampling of continuous-time Fourier transform of a minimum shift keying (MSK) waveform defined by the following equation:

$$P(f) = \mathrm{sinc}\left(-2f + \frac{1}{2}\right) + \mathrm{sinc}\left(2f + \frac{1}{2}\right)$$

and wherein the value is a sampled value at a certain location defined by the following equation $$s_{T,l} \triangleq \mathrm{sinc}\left(\frac{-2l+L+2}{M} + \frac{1}{2}\right) + \mathrm{sinc}\left(\frac{2l-L-2}{M} + \frac{1}{2}\right)$$

where l=1, 2, . . . , L.

5. The DFT-spread OFDM transmission method of claim 4, wherein the number L of the subcarriers is determined by the following equation $$L = \left(k + \frac{1}{2}\right)M$$

where k is an arbitrary natural number.

6. The DFT-spread OFDM transmission method of claim 4, wherein the generating of the frequency domain spectrum shaped pi/2-BPSK symbol vector $\underline{z}$ comprises performing frequency domain spectrum shaping with a second shaping vector $\underline{s}_{T2}$ generated by obtaining a Hadamard product of the first shaping vector $\underline{s}_T$ and a window vector $\underline{w}$ of one of Hamming, Hanning, Keiser, Gaussian, Tukey, Blackmann and Dolph-Chebyshev.

* * * * *